Figure 1:
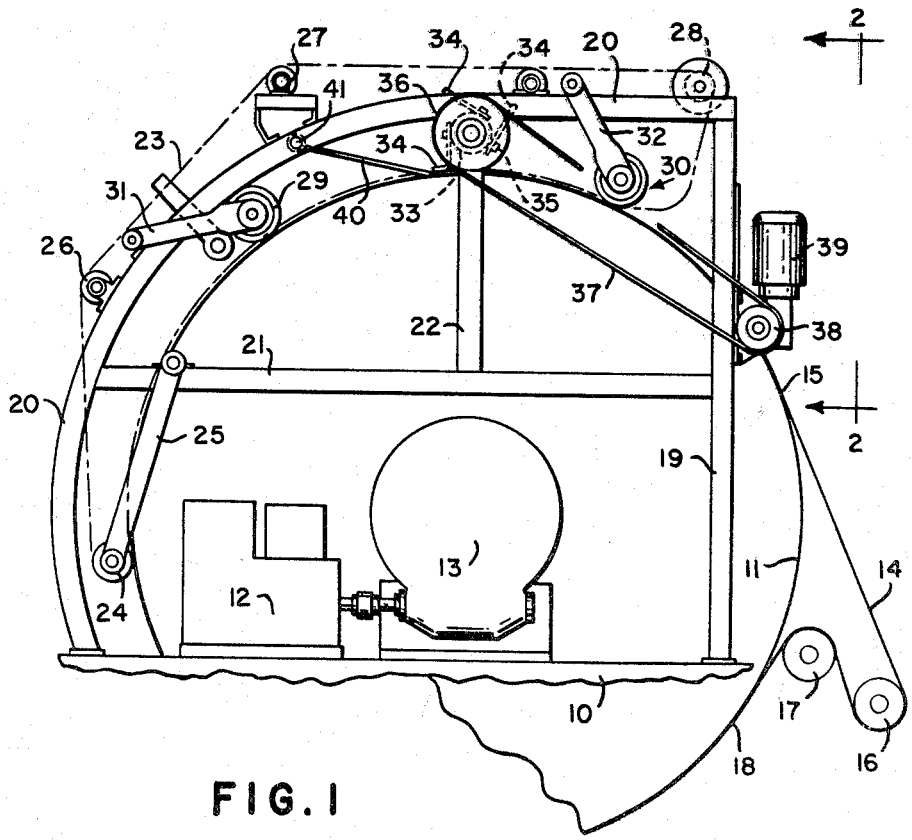

Feb. 23, 1965

L. E. H. REICHSTEIN 3,170,388

FILTER

Filed June 21, 1961

INVENTOR.
LANCE ERIC HAROLD REICHSTEIN

BY

ATTORNEYS cation and accompanying drawing which is merely exemplary.

3,170,388
FILTER
Lance Eric Harold Reichstein, Toorak, Victoria, Australia, assignor to Ametek, Inc., New York, N.Y., a corporation of Delaware
Filed June 21, 1961, Ser. No. 118,645
2 Claims. (Cl. 100—162)

The present invention relates to filters of the drum type, and particularly to a new and improved drum type filter embodying cake dewatering mechanism.

Although the principles of the invention are applicable to various types of drum filters, they will be shown and described as applied to a drum type string filter.

Filters of the drum type having closely spaced, peripherally extending strings that leave and return to the drum tangentially are commonly known. The filter cake builds up on the courses of string and passes from the drum as the strings leave the drum surface, thereupon falling into a collector as the strings pass over a breakup roll prior to returning to the drum periphery.

One of the principal problems of such filters is to reduce the moisture content of the cake as much as possible prior to the cake being removed from the drum. It has heretofore been the practice to employ a compressing mechanism which may comprise an endless belt that acts on a substantial portion of the filter cake that is collected on the periphery of the drum. Compression rolls are often employed with the belt to enhance its compression action.

The string discharge filter does not require air blow back to ease the filter cake off the drum at the point of discharge. This sometimes assists in achieving low moisture content because residual filtrate in the drainage lines is not blown back towards the cake by the air blast. In addition, the use of compression rolls and compression belt often assists in two ways; first, by sealing incipient cracks in the filter cake on the drum, thereby preventing channeling of the air through these cracks; and second, by exercising a wringing or mangle effect on the cake, expressing water from the voids between the solid particles of the cake. Low submergence operation sometimes assists by allowing a greater dewatering arc over the drum and also because low submergence usually means a thinner cake is built during the limited cake forming arc. With some materials, notably those exhibiting thixotropic properties, reduction in moisture can be achieved by mechanically disturbing the solids layer, thus releasing some of the water held by the material. Examples of this phenomenon occur in the filtration of starch where mechanical beaters or short duration air pulses have been used to assist in dewatering. The use of low vacuum in the cake forming zone is often of help in producing low moisture filter cakes because it promotes the formation of thin cakes on the drum and also promotes the formation of a low density cake with a higher percentage of voids between the particles to permit easier drainage of adhering liquid.

The principal object of this invention is to provide a drum filter embodying compression mechanism capable of reducing the moisture content of the filter cake below that heretofore obtained with known compressing devices.

Another object of the invention is to provide such a filter in which the usual compressing mechanism is augmented by a device that decreases the moisture content of the filter cake substantially below that obtainable with the compressing mechanism alone.

Still another object of the invention is to provide a drum type filter in which maximum dewatering of the filter cake is effected while maintaining a maximum cloth loading.

In one aspect of the invention, a rotatable drum filter may include discharge strings passing over its periphery, tangentially passing off the drum, over a discharge roll and finally tangentially back onto the drum. The drum may be partially submerged within a tank containing a slurry to be filtered, and vacuum producing means may be provided that subjects the submerged peripheral portion of the drum to a subatmospheric pressure.

In another aspect of the invention, a compression device may comprise an endless belt of canvas or other flexible material having a width equal to the axial dimension of the drum periphery and extending over a peripheral arc of the drum between the point where it leaves the slurry and the point where the strings tangentially leave the drum.

In still another aspect of the invention, compression rolls may ride on the endless belt forcing it into contact with the filter cake, compressing the same and thereby dewatering the cake. Alternatively, roller means may be employed alone without the endless belt for expressing moisture from the filter cake.

In still another aspect of the invention, cake agitating means may be provided, and in the embodiment disclosed it is shown as a cake flapper device comprising a rotatable drum having its longitudinal axis parallel with that of the filter drum and located substantially at the top dead center thereof. Flexible flappers may be attached to the flapper drum, and as the drum rotates, these flappers beat the cake beneath the endless belt, causing further dewatering of the cake, or alternatively, a sheet of flexible material may be maintained in position about a portion of the drum periphery for receiving the impact of the flappers when the endless belt is not employed.

It has been found that the combination of these two compression devices produces a dewatering of the filter cake far beyond that which each can effect individually, so that the combination is not the additive effect of both but a resulting dewatering of unobvious proportions.

The above, other objects and novel features of the invention will become apparent from the following specification and accompanying drawing which is merely exemplary.

Figure 2:
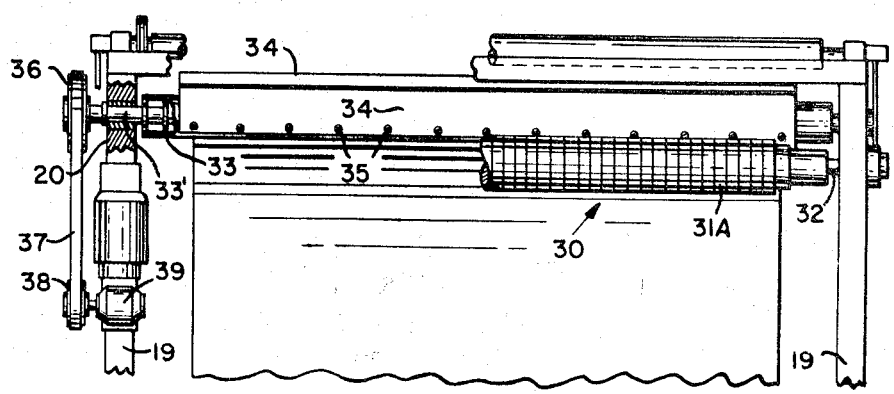

In the drawing:

FIG. 1 is an elevational view of a drum filter to which the principles of the invention have been applied; and FIG. 2 is a sectional view taken substantially along line 2—2 of FIG. 1.

Referring to the drawing, the principles of the invention are shown as applied to a vacuum drum string filter including a tank 10 adapted to contain a slurry to be filtered. The tank 10 may include bearings (not shown) for rotatably supporting a drum 11 that may be driven from a variable speed unit 12 through gear box 13.

The drum 11 may be of usual construction including a fabric peripheral coating about which a plurality of closely spaced strings 14 may extend. The strings 14 wrap around a substantial portion of the periphery of drum 11, leave it tangentially at a point 15, pass over a breakup roll 16, thence reversely over an idler roll 17 and finally return tangentially to the drum periphery at a point 18.

The drum 11 may have a substantial portion submerged within the slurry within tank 10 and may include means for subjecting the submerged peripheral portion thereof to a subatmospheric pressure, thereby causing filter cake to be built up on the drum periphery above the strings 14. As the strings 14 leave the drum at point 15, the cake which has the strings 14 embedded therein is peeled off the drum periphery, and as the strings pass over the breakup roll 16, the sharp curve to which they are subjected causes the cake to break up and fall into a hopper or the like.

In order to reduce the moisture content within the cake, compressing means may be employed. In the embodiment disclosed, this means is shown as supported by a framework including uprights 19 at each end of the tank, and between which the axis of rotation of drum 11 extends. A curved frame member 20 and cross members 21 and 22 are also provided.

An endless flexible belt 23 such as canvas or the like may wrap around a substantial portion of the periphery of the drum 11 above the slurry within tank 10. It may be guided by an idle roll 24 mounted on a lever 25 that is pivotally supported by the cross member 21. Other idle rolls 26, 27 and 28 may be supported by the curved frame member 20. Compressing rolls 29 and 30 may be mounted on levers 31 and 32 that are pivotally supported by member 20 also. The rolls 29 and 30 may comprise a plurality of individual disks 31A mounted on a shaft 32. The disks may have a central hole substantially larger than the diameter of shaft 32 so that each may move radially of shaft 32 independently of each other. The weight of the assembly of disks 31 is such as to effectively compress the filter cake beneath the endless belt 23, so that the combined effect of the belt 23, rolls 29, 30 and the dewatering vacuum to which the cake is subjected while above the slurry in tank 10 provides a cake having a predetermined moisture content as it drops from the strings 14 as they pass about breakup roll 16.

It has been found that the moisture content of the filter cake can be substantially reduced beyond that produced by the belt 23 and rolls 29 and 30 by applying a beater action to the belt 23 before it reaches the compressing roll 30. This reduction in moisture content can be shown to be substantially greater than that which would be expected by the additive effect of the compressing canvas and rolls and the flapper.

Referring again to the drawing, a roll 33 is fixed to a shaft 33' that is journaled in bearings supported by a frame member 20. Referring to FIG. 2, the drum 33 extends along an axis parallel to the axis of rotation of the drum 11, and extends beyond the face width thereof. A plurality of resilient flapper sheets 34 may be fixed to the roll 33, extending tangentially from its peripheral surface and located equidistant thereabout. These flapper sheets 34 may extend through out the length of roll 33 and may be fastened thereto by screws 35 or other suitable means.

A pulley 36 may be fixed to the one end of shaft 33' and a belt 37 may connect it to a drive pulley 38 fixed to the output shaft of a motor 39 that may be mounted on one of the uprights 19.

The roll 33 is supported at a point ahead of the compressing roll 30 and in the embodiment disclosed it is shown as being vertically above the axis of rotation of drum 11. It is spaced from the periphery of drum 11 such that as the roll 33 is rotated, the flexible sheets 34 slap against the belt 23 over its entire width and for a substantial lengthwise distance.

With a speed drum 11 within a range of about ¾ to 10 revolutions per minute, and a speed of rotation of roll 33 within a range of about 60 to 150 revolutions per minute, a decrease in the moisture content of the filter cake over that produced without the compressing belt 23 and the flapper means 34 was in the order of about 40%. On the other hand, with the compressing belt 23 and flapper means 34 employed separately, the reduction in moisture content amounted to about 15% and 18%, respectively.

Alternatively, the compressing device may comprise the rolls 29 and 30 independently of the belt 23, in which case, a flexible sheet 40 having a width equal to the axial length of the drum 11 may be supported from a bar 41 extending between the two curved frame members 20. The sheet 40 may lie beneath the roller 33 containing the flappers 34.

Although the various features of the new and improved drum filter and dewatering means have been shown and described in detail to fully disclose one embodiment of the invention, it will be evident that changes may be made in such details and certain features may be used without others without departing from the principles of the invention.

What is claimed is:

1. In a drum filter, a tank; a drum having a substantial portion thereof submerged within a slurry within said tank; a plurality of rolls spaced from the drum and parallel to the axis thereof, cake discharge means surrounding a substantial portion of the periphery of said drum, tangentially leaving said drum, passing over said rolls and tangentially returning to said drum; an endless compressing belt having a run thereof wrapped around a substantial arc of the periphery of said drum; a plurality of compressing roll means acting at spaced points along the run of said belt in contact with the periphery of said drum; a roll rotatable about an axis parallel with the axis of rotation of said drum and spaced radially beyond the periphery of said drum; flexible members attached to said roll and extending radially outwardly whereby upon rotation of said roll said flexible members slap the run of said belt in contact with the periphery of said drum; and means for rotating said roll.

2. A filter according to claim 1, wherein each of said flexible members comprises a continuous sheet.

References Cited in the file of this patent

UNITED STATES PATENTS

| 2,359,753 | Devine et al. | Oct. 10, 1944 |
| 2,963,158 | Jung | Dec. 6, 1960 |

FOREIGN PATENTS

| 725,347 | Great Britain | Mar. 2, 1955 |